United States Patent
Murakami (10) Patent No.: US 7,562,561 B2
(45) Date of Patent: Jul. 21, 2009

(54) INTAKE AIR LEAK DETERMINATION SYSTEM AND METHOD

(75) Inventor: Akira Murakami, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 104 days.

(21) Appl. No.: 11/735,084

(22) Filed: Apr. 13, 2007

(65) Prior Publication Data

US 2008/0255749 A1    Oct. 16, 2008

(51) Int. Cl.
G01M 15/04    (2006.01)
(52) U.S. Cl. ...................... 73/49.7; 73/114.31
(58) Field of Classification Search ............... 73/49.7, 73/114.31, 114.32, 114.33, 114.37, 114.38, 73/114.42, 114.45
See application file for complete search history.

(56) References Cited

U.S. PATENT DOCUMENTS

| | | | |
|---|---|---|---|
| 4,989,554 A | 2/1991 | Kushida et al. | |
| 5,437,154 A | 8/1995 | Sato et al. | |
| 5,571,958 A | 11/1996 | Hoshina | |
| 5,606,120 A | 2/1997 | Daicho et al. | |
| 5,617,722 A | 4/1997 | Takaku | |
| 5,656,765 A | 8/1997 | Gray | |
| 5,706,793 A | 1/1998 | Orzel et al. | |
| 5,893,042 A | 4/1999 | Lohmann et al. | |
| 6,425,384 B1 | 7/2002 | Howarth et al. | |
| 6,494,087 B2 | 12/2002 | Hatano et al. | |
| 6,568,246 B1 | 5/2003 | Ponagai et al. | |
| 6,655,357 B2 | 12/2003 | Murakami et al. | |
| 6,684,869 B2 | 2/2004 | Ponagai et al. | |
| 6,754,611 B2 | 6/2004 | Nagashima et al. | |
| 6,763,707 B2 | 7/2004 | Kumagai et al. | |
| 6,799,453 B2 | 10/2004 | Miyauchi et al. | |
| 6,801,848 B1 | 10/2004 | Mathews | |
| 6,820,470 B2 | 11/2004 | Shidara et al. | |
| 6,886,399 B2 | 5/2005 | Schnaibel et al. | |
| 6,895,934 B2 | 5/2005 | Kirschke et al. | |
| 6,907,871 B2 | 6/2005 | Fukusako et al. | |
| 6,931,838 B2 | 8/2005 | Kawamura | |
| 2002/0096158 A1 | 7/2002 | Murakami et al. | |
| 2004/0045541 A1 | 3/2004 | Akao et al. | |
| 2004/0107945 A1 | 6/2004 | Yeo | |
| 2004/0211249 A1 | 10/2004 | Kiyomura et al. | |
| 2004/0237635 A1 | 12/2004 | Ohsaki et al. | |

(Continued)

*Primary Examiner*—Eric S McCall
(74) *Attorney, Agent, or Firm*—Mark E. Duell; Fay Sharpe LLP (57) ABSTRACT

An intake manifold air leak determination system and method for an internal combustion engine including an intake manifold fluidly connected to a plurality of cylinders of the engine and a plurality of fuel injection valves for injecting fuel for the cylinders. Each of the plurality of fuel injection valves corresponds to a respective one of the plurality of cylinders. A fuel cutoff indicating module determines that fuel has been cut from one or more of said plurality of cylinders due to certain operating conditions of the internal combustion engine. An air leak detection module determines whether a significant air leak is occurring at the intake manifold. An air leak fuel cutoff module cuts off fuel supply to the fuel injection valves when the air leak detection module determines that a significant air leak is occurring at the intake manifold. An air leak detection prohibiting module prohibits detection of an air leak at the intake manifold when the fuel cutoff indicating module indicates that fuel has been cut from one or more of the plurality of cylinders.

22 Claims, 4 Drawing Sheets

U.S. PATENT DOCUMENTS

2005/0016502 A1 1/2005 Reischl et al.
2005/0022795 A1 2/2005 Beyer et al.
2005/0193987 A1 9/2005 Doering
2005/0210969 A1 9/2005 Albertson

INTAKE AIR LEAK DETERMINATION SYSTEM AND METHOD

BACKGROUND

The present disclosure generally relates to an air leak determination system and method for an internal combustion engine, and more particularly to an air leak determination system and method that includes determining whether to prohibit detection of an air leak at the intake manifold of the engine under certain operating conditions.

By way of background, some vehicles cut fuel to the vehicle's engine when a significant air leak is detected in the engine's intake manifold to stall the engine and prevent the vehicle from running. These vehicles typically include an electronic control unit (ECU) connected to the engine that is capable of commanding a fuel cut to effect stalling of the engine whenever a significantly large air leak is detected at the engine's intake manifold. One conventional method for detecting an air leak in or at the intake manifold, sometimes employed as a secondary or auxiliary air leak detection method, is for the ECU to compare intake manifold pressure to atmospheric pressure, such as when the vehicle's throttle closes completely. Should the intake manifold pressure approach atmospheric pressure or some predetermined threshold, the ECU can presume that a significantly large air leak is occurring in or at the intake manifold and then effect the aforementioned fuel cut operation.

Some vehicles also cut fuel to the vehicle's engine when a misfire condition within the engine is detected. Typically, a misfire condition is detected on a cylinder-by-cylinder basis and the supply of fuel is cut from the bank of cylinders (e.g., left bank and right bank) in which the offending cylinder resides. One purpose for cutting fuel to a misfiring cylinder is to prevent the catalytic converter from being destroyed via overheating. When fuel is cut to a bank of cylinders, such as in response to a cylinder misfire, comparing intake manifold pressure to atmospheric pressure or to a predetermined threshold for determining that an air leak is occurring in the intake manifold can yield an inaccurate determination of an air leak occurrence, particularly when the vehicle is operated at relatively high altitudes where low pressures (e.g., pressures below about 550 mmHg) are encountered. In other words, when one side bank of cylinders has its supply fuel cut, such as in response to a detection of a cylinder misfire in that side bank, intake manifold pressure may approach atmospheric pressure or some predetermined pressure threshold under some operating conditions without an air leak occurring in the intake manifold.

Another situation in which detection of an intake manifold air leak by comparing intake manifold pressure to atmospheric pressure or a predetermined threshold may fail is when a vehicle equipped with a variable cylinder management (VCM) system has a failure detection system that detects failure of the VCM system, such as a failed or stuck cylinder stop solenoid valve. One or more cylinder stop solenoid valves are used in a VCM system for inactivating a predetermined number of cylinders under certain operating conditions, such as during deceleration of the vehicle. In particular, the one or more cylinder stop solenoid valves can be used to selectively permit oil pressure to reach a cylinder deactivating device that hydraulically prevents operation of the intake and exhaust valves corresponding to the cylinders being deactivated. When a cylinder stop solenoid valve fails, it often fails in the open position allowing oil pressure to continue to reach the cylinder deactivating device and thereby maintaining the predetermined one or more cylinders to be deactivated in a deactivated state. Similar to when one side bank of fuel is cut, a failed cylinder stop solenoid valve causing a predetermined number of cylinders to remain deactivated can also cause intake manifold pressure to approach atmospheric pressure or a predetermined threshold even when no significant air leak is occurring at the intake manifold, particularly when the vehicle is operated at relatively high altitudes.

SUMMARY

According to one aspect, an intake manifold air leak determination system for an internal combustion engine is provided. More particularly, in accordance with this aspect, the intake manifold air leak determination system includes an intake manifold fluidly connected to a plurality of cylinders of the engine and a plurality of fuel injection valves for injecting fuel for the cylinders. Each of the plurality of fuel injection valves corresponds to a respective one of the plurality of cylinders. The system further includes a fuel cutoff indicating module, an air leak detection module, an air leak fuel cutoff module and an air leak detection module. The fuel cutoff indicating module indicates that fuel has been cut from one or more of the plurality of cylinders due to certain operating conditions of the internal combustion engine. The air leak detection module determines whether a significant air leak is occurring at the intake manifold. The air leak fuel cutoff module cuts off fuel supply to the fuel injection valves when the air leak detection module determines that a significant air leak is occurring at the intake manifold. The air leak detection prohibiting module prohibits detection of an air leak at the intake manifold by the air leak detection module when the fuel cutoff indicating module indicates that fuel has been cut from one or more of the plurality of cylinders.

According to another aspect, an intake manifold air leak determination method is provided for an intake manifold of an internal combustion engine. More particularly, in accordance with this aspect, the intake manifold air leak determination method includes determining whether fuel has been cut to one or more of a plurality of cylinders of the engine due to certain operating conditions of the engine, detecting whether a significant air leak is occurring at the intake manifold of the engine, cutting off fuel supply to fuel injection valves of the plurality of cylinders if determined that a significant air leak is occurring at the intake manifold of the engine and prohibiting detection of whether a significant air leak is occurring at the intake manifold when determined that fuel has been cut to one or more of the plurality of cylinders of the engine due to certain operating conditions of the engine.

According to yet another aspect, an intake manifold air leak determination system is provided for an internal combustion engine. More particularly, in accordance with this aspect, an intake manifold air leak determination system includes an intake manifold fluidly connected to a plurality of cylinders of the engine and a plurality of fuel injection valves for injecting fuel for the cylinders. Each of the plurality of fuel injection valves corresponds to a respective one of the plurality of cylinders. The system further includes a fuel cutoff indicating means for indicating that fuel has been cut from one or more of the plurality of cylinders due to at least one of failure of a VCM system of the engine and detection of a misfiring one of the plurality of cylinders which results in fuel being cut to at least said misfiring one of said plurality of cylinders. An air leak detection means is provided for determining whether a significant air leak is occurring at the intake manifold and an air leak detection prohibiting means is provided for prohibiting detection of an air leak at the intake manifold by the air leak detection means when the fuel cutoff indicating means indicates that fuel has been cut from one or more of the plurality of cylinders due to at least one of the failure of the VCM system and the detection of the misfiring one of the plurality of cylinders which results in said fuel being cut to at least said misfiring one of said plurality of cylinders.

According to still another aspect, an intake manifold air leak determination system is provided for an internal combustion engine. More particularly, in accordance with this aspect, the intake manifold air leak determination system includes an intake manifold fluidly connected to a plurality of cylinders of the engine and a plurality of fuel injection valves for injecting fuel for the cylinders. Each of the plurality of fuel injection valves corresponds to a respective one of the plurality of cylinders. The system further includes an electronic control unit (ECU) operatively connected to the plurality of fuel injection valves for control thereof. The ECU includes a fuel cutoff indicating module indicating that fuel has been cut from one or more of the plurality of cylinders due to certain operating conditions of the internal combustion engine, an air leak detection module determining whether a significant air leak is occurring at the intake manifold, and an air leak detection prohibiting module prohibiting detection of an air leak at the intake manifold by the air leak detection module when the fuel cutoff indicating module indicates that fuel has been cut from one or more of the plurality of cylinders.

DETAILED DESCRIPTION

Figure 1:
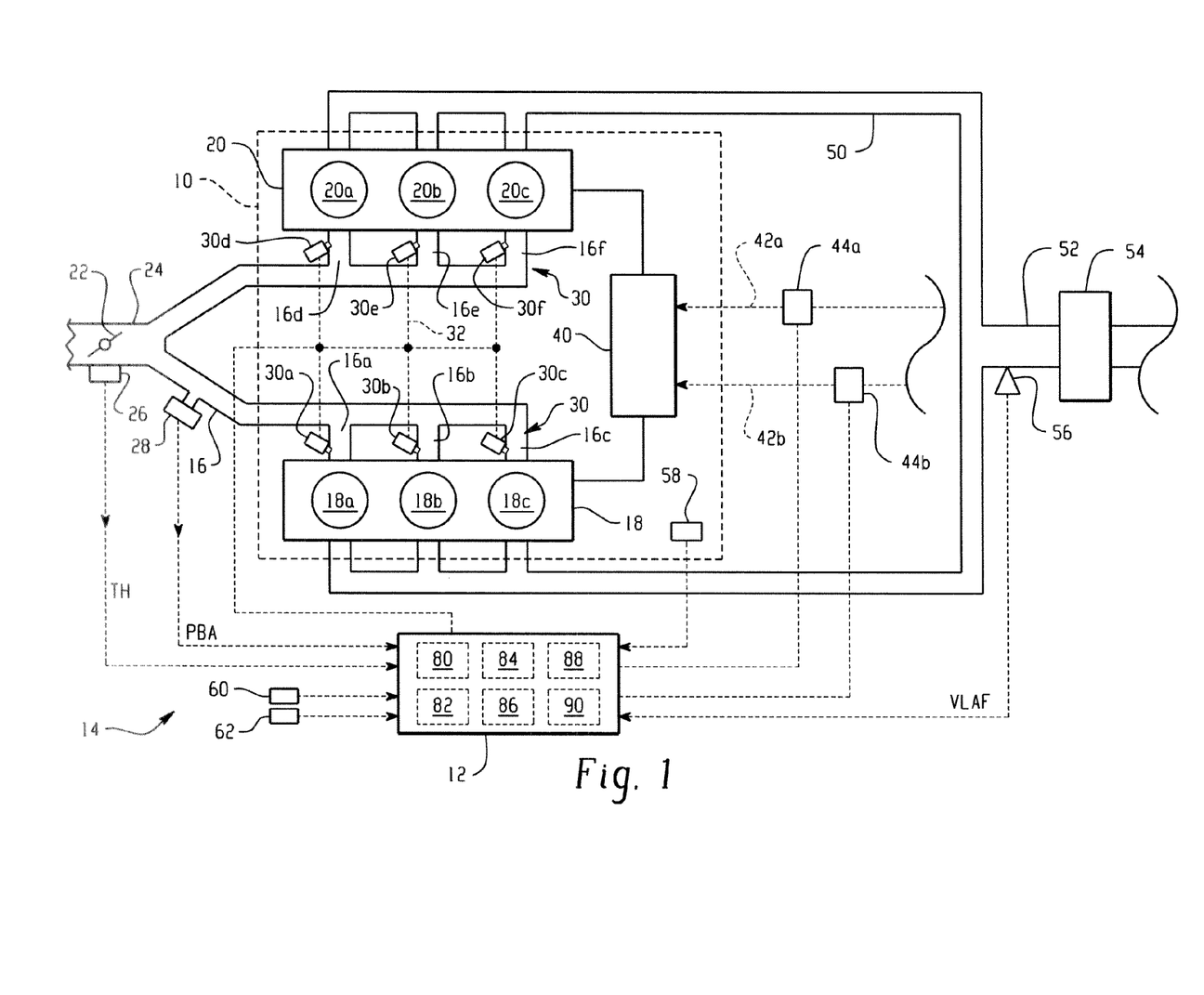
FIG. 1 is a schematic view of an intake air leak determination system for an internal combustion engine that determines whether to prohibit detection of an air leak at an engine's intake manifold.

Referring now to the drawings wherein the showings are for purposes of illustrating one or more exemplary embodiments, FIG. 1 schematically shows an internal combustion engine 10, an electronic control unit (ECU) 12 for controlling the engine 10 and a determination system 14 for determining whether to prohibit detection of an air leak at an intake manifold 16 of the engine. The internal combustion engine 10 of the illustrated embodiment is a six-cylinder engine and can be a V-type DOHC gasoline engine installed on a vehicle (not shown). Of course, as will be understood and appreciated by those skilled in the art, the engine 10 can have a different number of cylinders and/or be of some other type while still advantageously incorporating the features of the present disclosure. As schematically shown, the engine 10 of the illustrated embodiment includes a first or right cylinder bank 18 of three cylinders 18a,18b,18c and a second or left cylinder bank 20 of three cylinders 20a,20a,20c. In addition, the engine 10 can optionally be a variable-cylinder engine capable of being operated in an all-cylinder operation mode in which all of a plurality of cylinders of the engine 10 (six in the illustrated embodiment) are operated and a partial-cylinder operation mode in which one or more of the plurality of cylinders are deactivated.

The system 14 can employ a number of sensors for sensing various operating conditions of the engine 10 and communicating the sensed conditions as signals to the ECU 12. In the illustrated embodiment, a throttle valve 22 is arranged or disposed upstream of the manifold 16 (e.g., within an intake pipe 24 leading to the intake manifold 16) for regulating air flow thereinto. A degree of opening of the throttle valve 22 is sensed by a throttle valve opening sensor 26, also referred to herein as a throttle sensor, and communicated as a signal TH indicative of the sensed throttle valve opening to the ECU 12 via a link therewith. An absolute intake manifold pressure sensor 28 is provided downstream of the throttle valve 22 and on the intake manifold 16 to measure absolute intake pressure within the intake manifold 16. The sensor can be linked to the ECU 12 so the sensed pressure can be communicated as a signal PBA indicative of the sensed absolute intake pressure to the ECU 12. As used herein, a link or being linked is used broadly to cover any operative connection between components of the system 14 whether wired or wireless that enables the linked components to communicate (e.g., transmit a signal from one component to another). Alternatively, or in addition, intake negative pressure (PBGA) can be sensed in the intake pipe 24 or manifold 16 (e.g., by sensor 28 or another sensor) and/or calculated from the measured absolute intake pressure PBA (e.g., absolute intake pressure less atmospheric pressure).

The intake manifold 16 fluidly connects the intake pipe 24 to the six cylinders 18a-c and 20a-c via branch portions 16a-f, particularly through intake valves (not shown) of the cylinders. A plurality of fuel injectors 30 are provided for injecting fuel for the cylinders 18a-c and 20a-c. The fuel injectors 30, including individual injectors 30a-f, are disposed one each in the branch portions 16a-f such that each injector corresponds to a respective one of the cylinders and faces an intake port (not shown) of its corresponding cylinder. The injectors 30a-f are fluidly connected to a fuel pump, not shown, and linked to the ECU 12 for purposes of being individually controlled or operated (i.e., opened and/or closed) by the ECU 12 which thereby controls fuel injection therefrom. For example, as will be understood and appreciated by those skilled in the art, the ECU 12 could send a signal 32, such as a drive signal, to one or more injectors that can be used to open or close the injector(s) for a predetermined amount of time.

In the illustrated embodiment, the engine 10 further includes a variable cylinder management (VCM) system for inactivating or deactivating one or more of the plurality of cylinders 18a-c and 20a-c during a predetermined operation of the engine 16. The VCM system can include a VCM device 40 that operates the engine 10 in either an all-cylinder operation mode or a partial-cylinder operation mode, as will be understood and appreciated by those skilled in the art. In the partial-cylinder operation mode, the VCM device 40 performs a cylinder-deactivating operation in which a predetermined one or more cylinders are made inactive, i.e., operations thereof are stopped. For deactivating one or more of the cylinders, the device 40 is fluidly connected to a hydraulic pump (not shown) via oil passages 42a,42b. The VCM system further includes at least one cylinder stop electromagnetic or solenoid valve for regulating oil pressure to the VCM device

40. Arranged between the hydraulic pump and the VCM device 40 of the illustrated system 14 are a first electromagnetic or solenoid valve 44a for the intake valves of the one or more cylinders to be deactivated in the partial-cylinder operation mode and a second electromagnetic or solenoid valve 44b for exhaust valves of the same one or more cylinders. Thus, the illustrated system 14 employs two cylinder stop electromagnetic or solenoid valves 44a,44b for regulating oil pressure to the VCM device 40.

The solenoid valves 44a,44b are both of a normally-closed type and linked to the ECU 12 for operation thereof. The valves 44a,44b open the oil passages 42a,42b when commanded by the ECU 12 for supplying oil pressure from the hydraulic pump to the VCM device 40. When supplied with oil pressure, the VCM device 40 disconnects intake cams from their intake valves and disconnects exhaust cams from their exhaust valves in the cylinders that are being deactivated and thereby deactivates these cylinders. During the partial-cylinder operation mode, fuel injection from the injectors 30 corresponding to the one or more cylinders deactivated is stopped under control of the ECU 10.

In one embodiment, the VCM device 40 operates, when the ECU 10 opens the valves 44a,44b, to deactivate cylinders 20a and 20c (the first and third cylinders of the illustrated six cylinder engine 10) and the ECU 10 causes fuel to be cut from these same cylinders. To return to the all-cylinder operation mode, the valves 44a,44b are commanded to close the oil passages 42a,42b thereby arresting the supply of oil pressure from the hydraulic pump to the VCM device 40, which terminates the disconnection of the intake and exhaust valves from their respective cams, and the ECU again allows the fuel injection to the previously deactivated cylinders.

The illustrated engine 10 further includes an exhaust manifold 50 fluidly connected to the cylinders 30a-f, particularly through the exhaust valves of the cylinders. The exhaust manifold 50 is fluidly connected to an exhaust pipe 52 of the engine 10 which can have a three-way catalyst 54 arranged therein for reducing emissions of exhaust gases, such as HC, CO, and NOx. Further, a LAF sensor 56 (oxygen concentration-detecting means) can be arranged in the exhaust pipe 52 at a location upstream of the three-way catalyst 54. When employed, the LAF sensor 56 can linearly detect the concentration of oxygen in exhaust gases in a broad air-fuel ratio range from a rich region to a lean region and deliver a signal VLAF that is indicative of the detected concentration of oxygen to the ECU 12 which can use the transmitted signal to improve performance of the engine 10.

Any number of engine sensors, such as representative sensor 58, can be employed on or within the engine 10 for sensing various conditions about or related to the engine 10. Such sensors can be linked to the ECU 12 for communicating such sensed conditions to the ECU. For example, the sensor 58 can be any one or more of an engine coolant temperature sensor, a cylinder discriminating sensor, a TDC sensor, and/or a crank angle sensor (misfire-detecting sensor), etc. Additionally, separate sensors can be employed for sensing conditions external to the engine 10. Like the engine sensors, these sensors can be linked to the ECU for communicating therewith. For example, an atmospheric pressure sensor 60 can be employed to sense or measure atmospheric pressure PA, which is communicated to the ECU 12 via a link thereto. Any number of other separate sensors, such as representative sensor 62, can also be employed for sensing various other conditions external to the engine 10, such as vehicle running speed VP, battery voltage BV, etc, and communicating such sensed conditions to the ECU 12 over links with the ECU.

Figure 2:
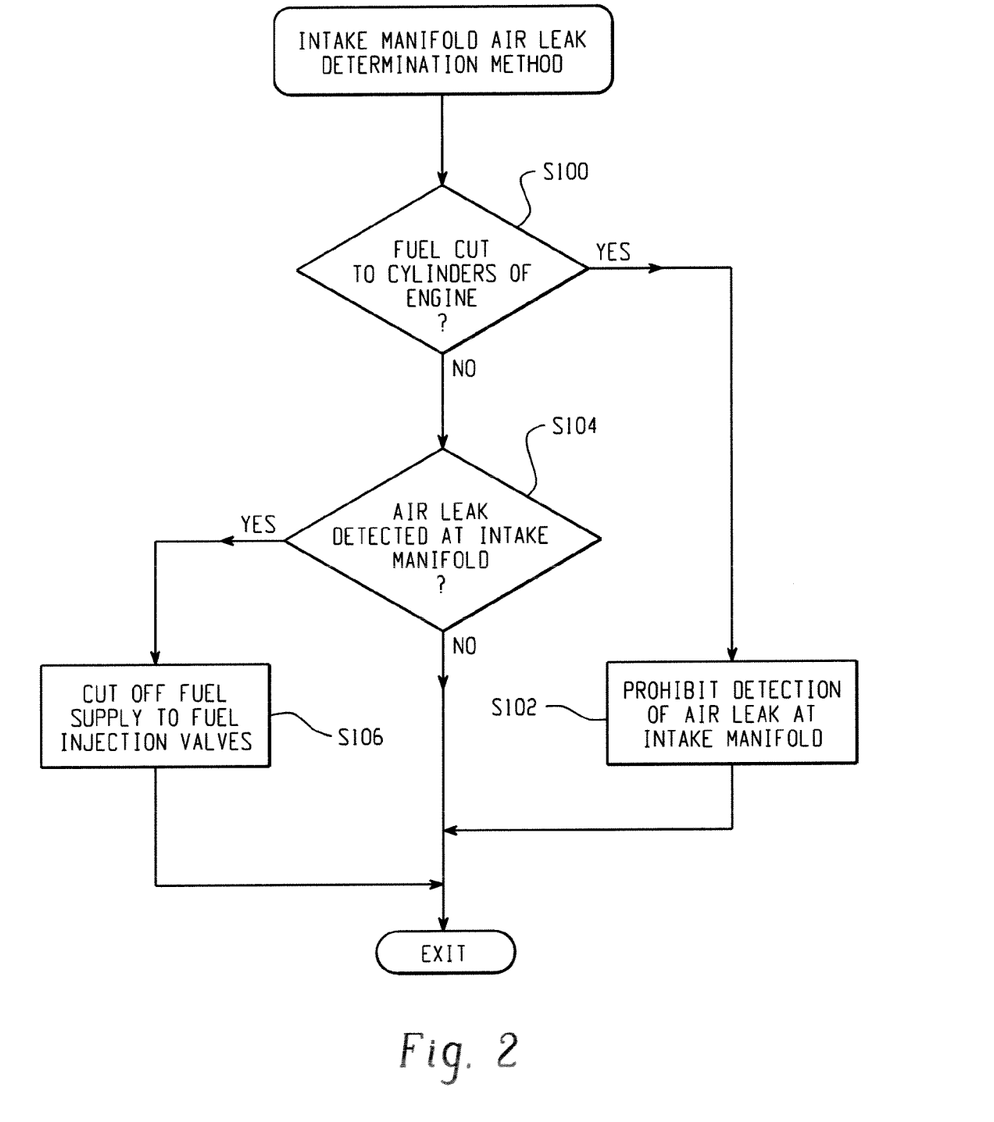
FIG. 2 is a block diagram illustrating an intake manifold air leak determination method that includes determining whether to prohibit detection of an air leak at the intake manifold of the engine under certain operating conditions.

As is known and understood by those skilled in the art, the ECU can be implemented by a microcomputer comprised of a CPU, a ROM for storing various operation programs or modules to be executed by the CPU, a RAM for storing the results of computations or the like by the CPU and any number of input/output interfaces, none of which are shown in FIG. 2. The CPU determines operating conditions based on signals received from the sensors, including, for example, the throttle sensor 26, the intake manifold pressure sensor 28 and the atmospheric pressure sensor 60 in the illustrated embodiment of FIG. 2. The signals delivered from the sensors are each input or provided to the CPU via one or more of the input/output interfaces. The CPU determines operating conditions of the engine 10 based on the signals received from the sensors in accordance with programs read from the ROM and, depending on the operating conditions, carries out the control processes described hereafter.

In one embodiment, the ECU (and specifically the CPU, ROM and/or RAM) includes several modules, including a fuel cutoff module 80 that indicates that fuel has been cut from one or more of the plurality of cylinders 18a-c and 20a-c of the engine 10 due to certain operating conditions of the engine, an air leak detection module 82 that determines whether a significant air leak is occurring at the intake manifold 16, an air leak fuel cutoff module 84 that cuts off fuel supply to the fuel injection valves 30 when the air leak detection module 82 determines that a significant air leak is occurring at the intake manifold 16, an air leak detection prohibiting module 86 that prohibits detection of an air leak at the intake manifold 16 by the air leak detection module 82 when the fuel cutoff indicating module 80 indicates that fuel has been cut from one or more of the plurality of cylinders 18a-c and 20a-c, a misfire-detecting module 88 that detects a misfire condition of the engine 10 and/or cuts fuel to one or more of the plurality of cylinders 18a-c and 20a-c including a misfiring one of the plurality of cylinders, and a failure-determining module 90 that determines that a failure of the VCM system has occurred.

As will be described in more detail below, the air leak detection module 82 can compare PBA, which is sensed by sensor 26 and relayed to the ECU 12, to PA, which is sensed by sensor 60 and relayed to the ECU 12, or to some predetermined threshold, to determine whether a significant air leak is occurring at the intake manifold 16. In one embodiment, the air leak detection module can be limited so as to only compare PBA to PA or a predetermined threshold to determine whether a significant air leak is occurring at the intake manifold when THA, which is sensed by sensor 26 and relayed to the ECU, indicates that the throttle valve 22 is closed. The fuel cutoff indicating module 80 can indicate that fuel has been cut from one or more of the plurality of cylinders 18a-c and 20a-c when at least one of (i) the misfire-detecting module 88 cuts or results in the cutting of fuel to one or more of the plurality of cylinders or (ii) the failure-determining module 90 determines that a failure of the VCM system has occurred. As an example, the failure-determining module 90 can determine that a failure of the VCM system has occurred when at least one of the cylinder stop solenoid valves 42a,42b has failed.

In the same or some other embodiment, the fuel cutoff indicating module 80 is a fuel cutoff indicating means for indicating that fuel has been cut from one or more of the plurality of cylinders 18a-c and 20a-c due to at least one of failure of a VCM system of the engine 10 and detection of and subsequent cutting of fuel to a misfiring one of the plurality of cylinders. Also, the air leak detection module 82 can be an air leak detection means for determining whether a significant air leak is occurring at the intake manifold 16 and the air leak detection prohibiting module 86 can be an air leak detection prohibiting means for prohibiting detection of an air leak at the intake manifold 16 by the air leak detection means when the fuel cutoff indicating means indicates that fuel has been cut from one or more of the plurality of cylinders 18a-c and 20a-c due to at least one of the failure of the VCM system and the detection of and subsequent cutting of fuel to the misfiring one of the plurality of cylinders.

Turning now to FIG. 2, an intake manifold air leak determination method, which can be carried out by the CPU in the ECU 12, is shown that determines whether to prohibit detection of an air leak at the intake manifold 16 of the engine 10 under certain operating conditions. First, in step S100, the determination system 14, and particularly the ECU 12, determines whether fuel to one or more of the cylinders 18a-c and 20a-c has been cut. If determined that fuel to one or more of the cylinders 18a-c and 20a-c has been cut in step S100, detection of a significant air leak at the intake manifold 16 is prohibited in step 5102. Alternatively, if there is no determination that fuel to the cylinders has been cut, a determination is made (i.e. a detection) as to whether a significant air leak is occurring at the intake manifold 16 in step S104. Should a significant air leak be detected to be occurring in step S104, then in step S106 the ECU 12 commands a fuel cut to all cylinders 18a-c and 20a-c and forces the engine 10 to stall.

Figure 3:
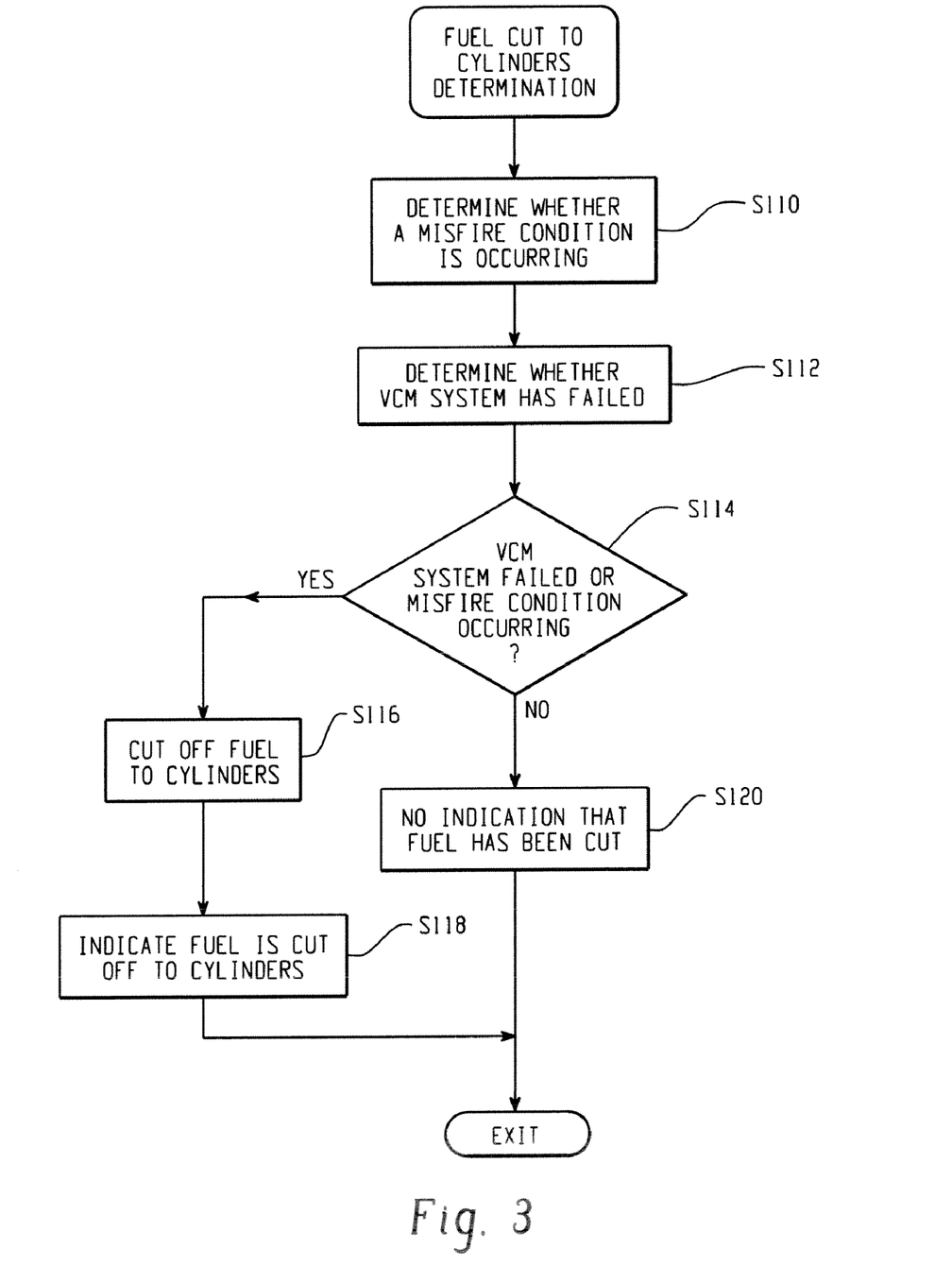
FIG. 3 is a block diagram illustrating a determination process for determining whether fuel is to be cut from cylinders of the internal combustion engine and indicating when fuel has been cut from the cylinders.

FIG. 3 shows a determination process for determining whether fuel has been cut to one or more of the engine's cylinders 18a-c and 20a-c in step S100 of FIG. 2. In step S110, a determination is made as to whether a misfire condition is occurring within the engine 10. In one embodiment, the ECU 12 determines whether a misfire has been detected in the engine 10. One suitable method for determining whether a misfire has occurred in an engine, such as engine 10, is taught and described in commonly owned U.S. Pat. No. 6,763,707, expressly incorporated herein by reference. Next, in step S112, a determination is made, particularly by the ECU 12, as to whether the VCM system of the engine 10 has failed. To determine whether the VCM system has failed in step S110, the ECU can determine whether one of the cylinder stop solenoid valves (CSSVs) 44a, 44b has failed. One suitable method for determining whether one of the CSSVs has failed, such as one of the valves 44a, 44b is taught and described in the above-referenced U.S. Pat. No. 6,763,707.

In step S114, the determinations of steps S110 and S112 are reviewed or analyzed. More particularly, if it is determined that a misfire condition is occurring in step S110 or that the VCM system has failed in step S112, the fuel is cut off to one or more of cylinders 18a-c and 20a-c in step S116 and an indication that such fuel has been cut off to the cylinder(s) is provided in step S118. On the other hand, if no determination is made in either step S110 that a misfire condition is occurring or in step S112 that the VCM system has failed, no indication that fuel has been cut off to the cylinders is provided in step S120.

Figure 4:
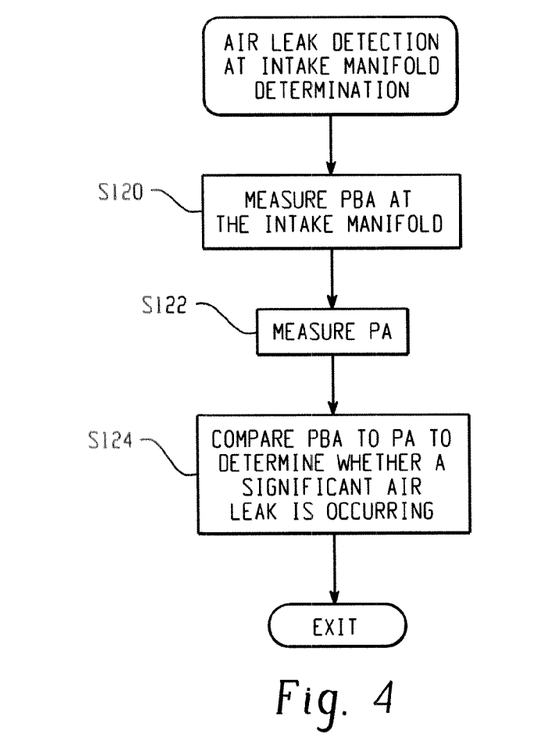
FIG. 4 is a block diagram illustrating a determination process for determining whether an air leak is occurring at the intake manifold.

FIG. 4 shows an air leak detection at the intake manifold determination process, which can be used for determining whether an air leak is detected at the intake manifold 16 in step S104 of FIG. 2. In step S120, PBA is measured at the intake manifold 16, such as by sensor 28, and is communicated to the ECU 12. In step S122, PA is measured, such as by sensor 58, and communicated to the ECU. Next, in step S16, the ECU 12 compares PBA to PA to determine whether a significant air leak is occurring at the intake manifold 16. For example, a determination that a significant air leak is occurring at the intake manifold 16 can be made when PBA exceeds or at least approaches PA. In one embodiment, the determination made in step S124 can be limited or related to the position of the throttle valve TH, as measured by sensor 26 and communicated to the ECU 12. More particularly, the comparison of PBA to PA can be limited to occur only when TH is at or within a predetermined range. For example, the comparison of PBA to PA can be limited to occur only when TH is at a value indicative of a closed or idling position of the throttle valve 22.

Figure 5:
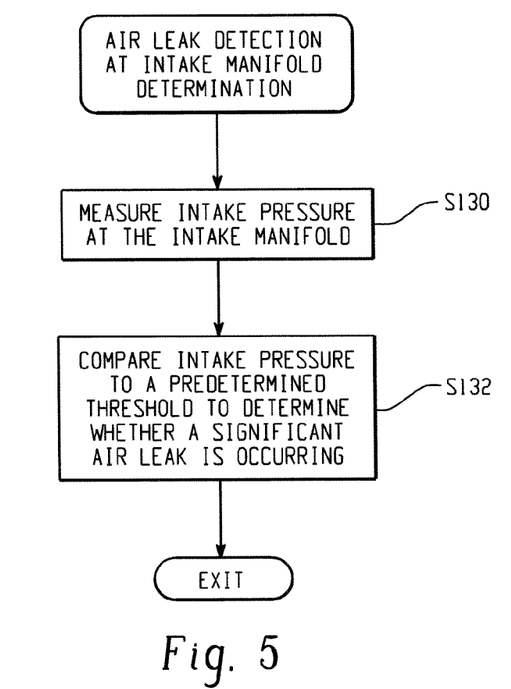
FIG. 5 is a block diagram illustrating an alternate determination process for determining whether an air leak is occurring at the intake manifold.

In an alternate embodiment, with additional reference to FIG. 5, determining whether a significant air leak is occurring in step S104 can include measuring intake pressure at the intake manifold 16 (step S130). In particular, measuring intake pressure can continue to include measuring PBA at the intake manifold by sensor 28 and communicating PBA to the ECU 12. Alternatively, or in addition, PBGA can be measured and/or calculated. In either case, intake pressure (e.g., PBA or PBGA) can be compared to a predetermined threshold to determine if a significant air leak is occurring at the intake manifold 16 (step S132). In one example, the ECU 12 can determine that a significant air leak is occurring when PBGA is greater than negative fifty (−50) mmHg, i.e., one exemplary predetermined threshold. The comparison of PBA or PBGA (i.e., intake pressure) to the predetermined threshold can again be optionally limited to occur only when TH is at a value indicative of a closed or idling position of the throttle valve 22.

In another alternate embodiment, the method of FIG. 2 can be limited so as to only occur under certain operating conditions encountered by the engine 10. For example, PA can be measured and compared to a predetermined operating threshold to determine whether the engine 10 is operating at low atmospheric pressures, such as caused by high altitudes for example. When the comparison of PA to the predetermined operating threshold indicates that the engine 10 is operating within low atmospheric pressure, such as below 600 mmHg for example, the intake manifold air leak determination method of FIG. 2 operates as already described herein. In the event that PA is above the predetermined threshold (indicating that the engine 10 is not being operated within low atmospheric pressure), the ECU need not run the determination method of FIG. 2 and thus prohibition of significant air leak detection may only occur when PA is less than the predetermined threshold of the 600 mmHg.

It will be appreciated that various of the above-disclosed and other features and functions, or alternatives thereof, may be desirably combined into many other different systems or applications. For example, it should be appreciated that an engine need not be exactly like the engine 10 described herein (i.e., the engine need not be a six cylinder or a DOHC engine). Moreover, the engine need not have a VCM system and/or a misfire detection system to take advantage of the air leak determination system and method described herein. Also it is to be appreciated that various presently unforeseen or unanticipated alternatives, modifications, variations or improvements therein may be subsequently made by those skilled in the art which are also intended to be encompassed by the following claims.

The invention claimed is:

1. An intake manifold air leak determination system for an internal combustion engine, comprising:

an intake manifold fluidly connected to a plurality of cylinders of the engine;

a plurality of fuel injection valves for injecting fuel for the cylinders, each of said plurality of fuel injection valves corresponding to a respective one of said plurality of cylinders;

a fuel cutoff indicating module indicating that fuel has been cut from one or more of said plurality of cylinders but less than all of said plurality of cylinders due to certain operating conditions of the internal combustion engine;

an air leak detection module determining whether a significant air leak is occurring at said intake manifold;

an air leak fuel cutoff module cutting off fuel supply to all of said fuel injection valves when said air leak detection module determines that a significant air leak is occurring at said intake manifold; and an air leak detection prohibiting module prohibiting detection of an air leak at said intake manifold by said air leak detection module when said fuel cutoff indicating module indicates that fuel has been cut from said one or more of said plurality of cylinders.

2. The intake manifold air leak determination system of claim 1 further including an ECU linked to said plurality of fuel injection valves for controlling fuel injection therefrom, said ECU including said fuel cutoff indicating module, said air leak detection module, said air leak fuel cutoff module and said air leak prohibiting module.

3. The intake manifold air leak determination system of claim 2 further including:
a manifold pressure sensor disposed on said intake manifold for measuring absolute manifold pressure (PBA) and linked to said ECU for communicating PBA thereto; and an atmospheric pressure sensor for measuring atmospheric pressure (PA) linked to said ECU for communicating PA thereto, said air leak detection module comparing PBA to PA to determine whether a significant air leak is occurring at said intake manifold.

4. The intake manifold air leak detection system of claim 3 further including:
a throttle valve disposed upstream of said intake manifold for regulating airflow thereinto; and a throttle sensor for measuring a degree of throttle opening (THA) of said throttle valve, said air leak detection module only comparing PBA to PA to determine whether a significant air leak is occurring at said intake manifold when THA indicates that said throttle valve is closed.

5. The intake manifold air leak detection system of claim 1 further including:
a VCM system for inactivating one or more of said plurality of cylinders during a predetermined operation of the engine; and a failure-determining module determining that a failure of said VCM system has occurred, said fuel cutoff indicating module indicating that fuel has been cut from one or more of said plurality of cylinders when said failure-determining modules determines that a failure of said VCM system has occurred.

6. The intake manifold air leak detection system of claim 5 further including:
a misfire-detecting module detecting a misfire condition of the engine and cutting fuel to one or more of said plurality of cylinders including a misfiring one of said plurality of cylinders, said fuel cutoff indicating module indicating that fuel has been cut from one or more of said plurality of cylinders when said misfire-detecting module cuts fuel to one of more of said plurality of cylinders.

7. The intake manifold air leak detection system of claim 5 wherein said VCM system includes:
a VCM device that deactivates said one or more of said plurality of cylinders when oil pressure is received thereby; and at least one cylinder stop solenoid valve for regulating oil pressure to said VCM device, said failure-determining module determining that a failure of said VCM system has occurred when said at least one cylinder stop solenoid valve has failed.

8. The intake manifold air leak detection system of claim 1 further including:
a misfire-detecting module detecting a misfire condition of the engine and cutting fuel to one or more of said plurality of cylinders including a misfiring one of said plurality of cylinders, said fuel cutoff indicating module indicating that fuel has been cut from one or more of said plurality of cylinders when said misfire-detecting module cuts fuel to one of more of said plurality of cylinders.

9. An intake manifold air leak determination method for an intake manifold of an internal combustion engine, comprising:
(a) determining whether fuel has been cut to one or more of a plurality of cylinders of the engine due to certain operating conditions of the engine;
(b) detecting whether a significant air leak is occurring at the intake manifold of the engine;
(c) cutting off fuel supply to fuel injection valves of all of said plurality of cylinders if determined that a significant air leak is occurring at the intake manifold of the engine in (b); and
(d) prohibiting detection of whether a significant air leak is occurring at the intake manifold in (b) when determined that fuel has been cut to one or more of said plurality of cylinders in (a).

10. The intake manifold air leak determination method of claim 9 wherein (a) includes:
determining whether a VCM system for inactivating one or more of said plurality of cylinders during a predetermined operation of the engine has failed, failure of said VCM system indicating that fuel has been cut to one or more of said plurality of cylinders of the engine in (a).

11. The intake manifold air leak determination method of claim 10 wherein determining whether said VCM system has failed includes determining whether a cylinder stop solenoid valve of said VCM system has failed.

12. The intake manifold air leak determination method of claim 9 wherein (a) includes:
determining whether a misfire condition of the engine is occurring, a misfire condition of said engine indicating that fuel has been cut to one or more of said plurality of cylinders of the engine in (a).

13. The intake manifold air leak determination method of claim 9 wherein (a) includes:
determining whether a VCM system for inactivating one or more of said plurality of cylinders during a predetermined operation of the engine has failed;
determining whether a misfire condition of the engine is occurring; and
at least one of a determination that said VCM system has failed and a determination that a misfire condition of the engine is occurring causing a determination that fuel has been cut to one or more of said plurality of cylinders of the engine in (a).

14. The intake manifold air leak determination method of claim 9 wherein (b) includes:
measuring absolute manifold pressure (PBA) at the intake manifold;
measuring atmospheric pressure (PA); and
comparing PBA to PA to determine whether a significant air leak is occurring at the intake manifold.

15. The intake manifold air leak determination method of claim 14 wherein comparing PBA to PA only occurs when a throttle sensor indicates that a throttle valve disposed upstream of the intake manifold is closed.

16. The intake manifold air leak determination method of claim 9 wherein (b) includes:
   measuring intake pressure at the intake manifold; and
   comparing the measured intake pressure to a predetermined threshold to determine whether a significant air leak is occurring at the intake manifold.

17. The intake manifold air leak determination method of claim 16 wherein said predetermined threshold is about −50 mmHg.

18. The intake manifold air leak determination method of claim 17 wherein comparing intake pressure to said predetermined threshold only occurs when a throttle sensor indicates that a throttle valve disposed upstream of the intake manifold is closed.

19. The intake manifold air leak determination method of claim 9 wherein prohibiting detection of whether a significant air leak is occurring in (d) only occurs when the engine is operated at relatively high altitudes.

20. The intake manifold air leak determination method of claim 19 wherein said high altitudes are altitudes in which atmospheric pressure (PA) is below about 650 mmHg.

21. An intake manifold air leak determination system for an internal Combustion engine, comprising:
   an intake manifold fluidly connected to a plurality of cylinders of the engine;
   a plurality of fuel injection valves for injecting fuel for the cylinders, each of said plurality of fuel injection valves corresponding to a respective one of said plurality of cylinders;
   a fuel cutoff indicating means for indicating that fuel has been cut from one or more of said plurality of cylinders due to at least one of failure of a VCM system of the engine and detection of a misfiring one of said plurality of cylinders which results in fuel being cut to at least said misfiring one of said plurality of cylinders;
   an air leak detection means for determining whether a significant air leak is occurring at said intake manifold; and
   an air leak detection prohibiting means for prohibiting detection of an air leak at said intake manifold by said air leak detection means when said fuel cutoff indicating means indicates that fuel has been cut from one or more of said plurality of cylinders due to at least one of said failure of said VCM system and detection of said misfiring one of said plurality of cylinders which results in said fuel being cut to at least said misfiring one of said plurality of cylinders.

22. An intake manifold air leak determination system for an internal combustion engine, comprising:
   an intake manifold fluidly connected to a plurality of cylinders of the engine;
   a plurality of fuel injection valves for injecting fuel for the cylinders, each of said plurality of fuel injection valves corresponding to a respective one of said plurality of cylinders; and
   an electronic control unit (ECU) operatively connected to said plurality of fuel injection valves for control thereof, said ECU including:
      a fuel cutoff indicating module indicating that fuel has been cut from one or more of said plurality of cylinders due to certain operating conditions of the internal combustion engine, said one or more of said plurality of cylinders less than a total number of said plurality of cylinders,
      an air leak detection module determining whether a significant air leak is occurring at said intake manifold, and
   an air leak detection prohibiting module prohibiting detection of an air leak at said intake manifold by said air leak detection module when said fuel cutoff indicating module indicates that fuel has been cut from said one or more of said plurality of cylinders.

* * * * *